United States Patent
Walters et al.

(10) Patent No.: US 11,372,692 B2
(45) Date of Patent: Jun. 28, 2022

(54) METHODS AND SYSTEMS FOR APPLICATION PROGRAM INTERFACE CALL MANAGEMENT

(71) Applicant: Capital One Services, LLC, McLean, VA (US)

(72) Inventors: Austin Walters, Savoy, IL (US); Anh Truong, Champaign, IL (US); Vincent Pham, Champaign, IL (US); Jeremy Goodsitt, Champaign, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/904,774

(22) Filed: Jun. 18, 2020

(65) Prior Publication Data

US 2021/0397489 A1 Dec. 23, 2021

(51) Int. Cl.
*G06F 9/54* (2006.01)
*G06F 9/50* (2006.01)

(52) U.S. Cl.
CPC ............... *G06F 9/54* (2013.01); *G06F 9/505* (2013.01); *G06F 9/5038* (2013.01); *G06F 2209/503* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 8,881,182 B1* | 11/2014 | Jorgensen | G06F 9/54 |
| | | | 719/328 |
| 8,996,695 B2 | 3/2015 | Anderson et al. | |
| 9,311,160 B2 | 4/2016 | Parker | |
| 9,900,264 B1* | 2/2018 | Chen | H04L 29/06 |
| 2003/0046396 A1 | 3/2003 | Richter et al. | |
| 2014/0006609 A1* | 1/2014 | Gay | H04L 43/0876 |
| | | | 709/224 |
| 2014/0026119 A1* | 1/2014 | DeJana | G06F 9/505 |
| | | | 717/124 |
| 2015/0222504 A1* | 8/2015 | Srivastava | G06F 11/3041 |
| | | | 709/224 |
| 2016/0284128 A1* | 9/2016 | Michalscheck | G06T 19/006 |
| 2017/0060633 A1* | 3/2017 | Suarez Gracia | G06F 9/505 |
| 2017/0278087 A1* | 9/2017 | Beda, III | H04L 43/0817 |
| 2019/0034199 A1* | 1/2019 | Pollock | G06F 8/73 |
| 2019/0243692 A1* | 8/2019 | Lincoln | G06F 9/541 |
| 2020/0004598 A1* | 1/2020 | Brebner | H04L 67/141 |
| 2020/0090277 A1 | 3/2020 | Kemp, II et al. | |
| 2020/0250015 A1* | 8/2020 | Zhi | G06F 16/9566 |

\* cited by examiner

*Primary Examiner* — Chat C Do
*Assistant Examiner* — William C Wood
(74) *Attorney, Agent, or Firm* — Bookoff McAndrews, PLLC

(57) ABSTRACT

Disclosed are systems and methods for application program interface (API) call management. For example a method may include obtaining API call information for one or more API endpoints, the API call information including a number of API calls to the one or more API endpoints; obtaining resource utilization (RU) information, the RU information including project RU information for one or more projects; analyzing the API call information and the RU information to obtain API cost information, the API cost information including cost per API call for the one or more API endpoints; and managing subsequent API calls to the one or more API endpoints based on the cost per API call.

19 Claims, 5 Drawing Sheets

METHODS AND SYSTEMS FOR APPLICATION PROGRAM INTERFACE CALL MANAGEMENT

TECHNICAL FIELD

Various embodiments of the present disclosure relate generally to methods and systems for API call management.

BACKGROUND

There may be several registered application program interfaces (APIs) for an entity, such as a company. Accordingly, there is a need to determine and manage resource utilization for API calls to such APIs.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for API call management.

In one aspect, a method is disclosed for application program interface (API) call management. The method may include: obtaining API call information for one or more API endpoints, the API call information including a number of API calls to the one or more API endpoints; obtaining resource utilization (RU) information, the RU information including project RU information for one or more projects; analyzing the API call information and the RU information to obtain API cost information, the API cost information including cost per API call for the one or more API endpoints; and managing subsequent API calls to the one or more API endpoints based on the cost per API call.

In another aspect, there is provided a system for application program interface (API) call management. The system may include a memory storing instructions; and one or more processors. The one or more processors may be configured to execute the instructions to perform a process including: obtaining API call information for one or more API endpoints, the API call information including a number of API calls to the one or more API endpoints; obtaining resource utilization (RU) information, the RU information including project RU information for one or more projects; analyzing the API call information and the RU information to obtain API cost information, the API cost information including cost per API call for the one or more API endpoints; and managing subsequent API calls to the one or more API endpoints based on the cost per API call by performing an API call request management process, the API call request management process including: receiving an API call request from a project, the API call request indicating an API call to an API endpoint; retrieving a cost per API call for the API endpoint; determining whether a budget of the project is sufficient for the cost per API call; declining the API call request when the determining determines the budget of the project is not sufficient for the cost per API call; and permitting the API call of the API call request when the determining determines the budget of the project is sufficient for the cost per API call.

In another aspect, there is provided a method for application program interface (API) call management. The method may include: obtaining API call information for one or more API endpoints, the API call information including a number of API calls to the one or more API endpoints; obtaining resource utilization (RU) information, the RU information including project RU information for one or more projects; analyzing the API call information and the RU information to obtain API cost information, the API cost information including cost per API call for the one or more API endpoints, wherein the analyzing the API call information and the RU information to obtain the API cost information includes: determining a number of API calls to each of the one or more API endpoints; and determining the cost per API call for the one or more API endpoints by: dividing a cost for each of the one or more projects by the number of API calls to each of the API endpoints corresponding to the one or more projects for API endpoints corresponding to the one or more projects, and obtaining pricing rules from service(s) associated with the API endpoints not corresponding to the one or more projects for API endpoints not corresponding to the one or more projects.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
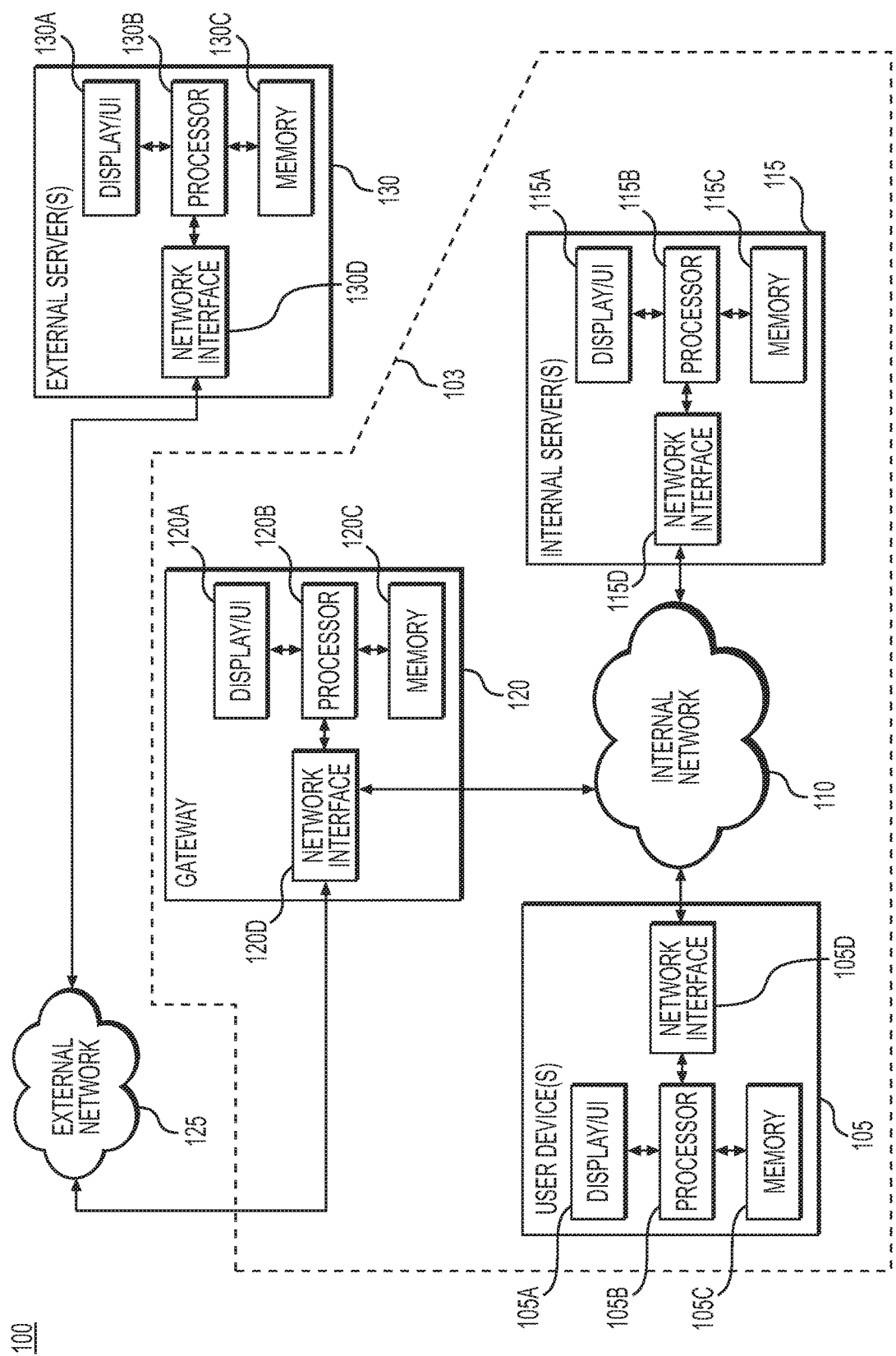
FIG. 1 depicts an exemplary system for API call management, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

One or more APIs may be registered for an entity (e.g., a company) via external servers (e.g., providing and/or supporting external services such as vendor products), internal servers (e.g., providing and/or supporting internal services such as internal projects), etc. For such APIs, internal systems (e.g., a gateway) may determine API usage in addition to network traffic and resource utilization within the entity. In some embodiments, resource utilization for an API call may be determined based on tracked API calls and work load on the resources associated with the tracked API calls. In some embodiments, resource utilization for the API call may be determined further based on network traffic.

In some embodiments, a system (e.g., a gateway) may be utilized to query the number of API calls made to endpoints within an entity, e.g., a company. In other embodiments, router logs may be utilized to track the number of API calls. In some embodiments, API calls may be cross-correlated towards resource utilization for projects within the entity. For example, an API for a particular project may have an allocated IP and the IP may be checked against resource utilization for an API call directed to the project.

In some embodiments, the system may divide resource utilization per API call. That is, the total resource utilization for a project may be divided by the total number of API calls directed to the project. In some embodiments, the cost associated with each project may be ranked based on API calls per project. API calls to one or more projects may be limited based on budget allocation in view of the cost associated with each project (also referred to herein as API "throttling"). In the context of the current disclosure, resource utilization may be referred to as a metric indicating any resource directed towards a project, such as, for example, costs incurred and/or compute cycles performed on cloud computing platforms, time and resources allocated to the project (e.g., engineering costs at hourly rates), etc. In some embodiments, network packets associated API calls from relatively high priority endpoint may be prioritized. For example, if the IP of one endpoint is related to a high priority task, then the API calls to the IP may be prioritized. In some embodiments, network packets associated with particular API calls may be further prioritized based on network traffic.

FIG. 1 depicts an exemplary system 100 for API call management, according to one or more embodiments. The system 100 may include one or more user device(s) 105, an internal network 110, an internal server 115, a gateway 120, an external network 125, and/or an external server 130. Hereafter, while the internal server 115, the gateway 120, and/or the external server 130 may interact with one or a plurality of the one or more user devices 105, this description will refer to the one or more user devices 105 as "the user device 105," so as to simplify the description of the concepts described herein. One of skill in the art would recognize that the internal server 115, the gateway 120, and/or the external server 130 may configure the one or more user devices 105 so as to experience different functionalities and/or have access to different information (e.g., determined by credentials such as user ID/password). Additionally, while the functionality carried out by the internal server 115, the gateway 120, the external server 130, and/or the user device 105 are discussed herein separately, in practice these features may be executed on more or fewer devices.

As shown in FIG. 1, the user device 105, the internal server 115, and/or the gateway 120 may be part of an organization environment 103. In the context of the current disclosure, an organization environment may include any networked environment associated with a business and/or enterprise. The user device 105, the internal server 115, and/or the gateway 120 may be connected via the internal network 110, using one or more standard communication protocols. The internal network 110 may be one or a combination of a wide area network (e.g., the Internet), a local network, or other network. The user device 105, the internal server 115, and/or the gateway 120 may transmit and receive messages from each other across the internal network 110. For example, the user device 105 may transmit one or more API calls to the internal server 115. As shown in FIG. 1, the gateway 120 may provide the user device 105 and/or the internal server 115 with connection to the external server 130 via an external network 125, using one or more standard communication protocols. Accordingly, the user device 105 and/or the internal server 115 may transmit and receive messages to and from the external server 130 via the gateway 120. For example, the user device 105 and/or internal server 115 may transmit one or more API calls to the external server 130.

The user device 105 may include a display/user interface (UI) 105A, a processor 105B, a memory 105C, and/or a network interface 105D. The user device 105 may be a computer, a cell phone, a tablet, etc. The user device 105 may execute, by the processor 105B, an operating system (O/S) and at least one application (each stored in memory 105C). The application may be a browser program or a mobile application program (which may also be a browser program in a mobile O/S). The application may generate one or more graphic user interfaces (GUIs) based on instructions/information stored in the memory 105C, instructions/information received from the internal server 115, and/or instructions/information received from the external server 130. For instance, the GUIs might be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the internal network 110. The processor 105B, while executing the application, may receive user inputs from the display/UI 105A, and perform actions or functions in accordance with the application.

The internal server(s) 115 may include a display/UI 115A, a processor 115B, a memory 115C, and/or a network interface 115D. The server 115 may be a computer, system of computers (e.g., rack server(s)), and/or or a cloud service computer system. The internal server 115 may execute, by the processor 115B, an operating system (O/S) and at least one instance of an internal server program (each stored in memory 115C). The server 115 may store or have access to server information (e.g., hosted on a third-party server). The display/UI 115A may be a touch screen or a display with other input systems (e.g., mouse, keyboard, etc.) for an operator of the internal server 115 to control the functions of the internal server 115 (e.g., update the internal server program and/or the internal server information). The network interface 115D may be a TCP/IP network interface for, e.g., Ethernet or wireless communications with the internal network 110.

The server program, executed by the processor 115B on the server 115, may be configured to perform a method for API call management. The method may include: obtaining API call information for one or more API endpoints, the API call information including a number of API calls to the one or more API endpoints; obtaining resource utilization (RU) information, the RU information including project RU information for one or more projects; analyzing the API call information and the RU information to obtain API cost information, the API cost information including cost per API call for the one or more API endpoints; and managing subsequent API calls to the one or more API endpoints based on the cost per API call. Further details of the server program are discussed below.

The gateway 120 may include a display/UI 120A, a processor 120B, a memory 120C, and/or a network interface 120D. In some embodiments, the gateway 120 may be configured to direct and/or throttle network packets associated with API calls transmitted by the user device 105, the internal server 115 and/or the external server 130, as will be described in further detail below. The gateway 120 may be a computer, system of computers (e.g., rack server(s)), and/or or a cloud service computer system. The gateway 120 may execute, by the processor 120B, an operating system (O/S) and at least one instance of a gateway program (each stored in memory 120C). The gateway 120 may store or have access to gateway information (e.g., hosted on a third-party server). The display/UI 120A may be a touch screen or a display with other input systems (e.g., mouse, keyboard, etc.) for an operator of the gateway 120 to control the functions of the gateway 120 (e.g., update the gateway program and/or the gateway information). The network interface 120D may be a TCP/IP network interface for, e.g., Ethernet or wireless communications with the internal network 110 and/or the external network 125.

The external server 130 may include a display/UI 130A, a processor 130B, a memory 130C, and/or a network interface 130D. In some embodiments, the external server 130 may be a virtual computing platform. The external server 130 may be a computer, system of computers (e.g., rack server(s)), and/or or a cloud service computer system. The external server 130 may execute, by the processor 130B, an operating system (O/S) and at least one instance of an external server program (each stored in memory 130C). The external server 130 may store or have access to server information (e.g., hosted on a third-party server). The display/UI 130A may be a touch screen or a display with other input systems (e.g., mouse, keyboard, etc.) for an operator of the external server 130 to control the functions of the external server 130 (e.g., update the external server program and/or the external server information). The network interface 130D may be a TCP/IP network interface for, e.g., Ethernet or wireless communications with the internal network 110 and/or the external network 125. The external server 130 may provide external services such as cloud computing services. For example, the external server 130 may provide cloud computing platforms and APIs to user device 105 to utilize such cloud computing services. The cloud computing services may be provided on a metered pay-as-you-go format or a fixed rate format that provides unlimited access for a fixed rate.

Figure 2:
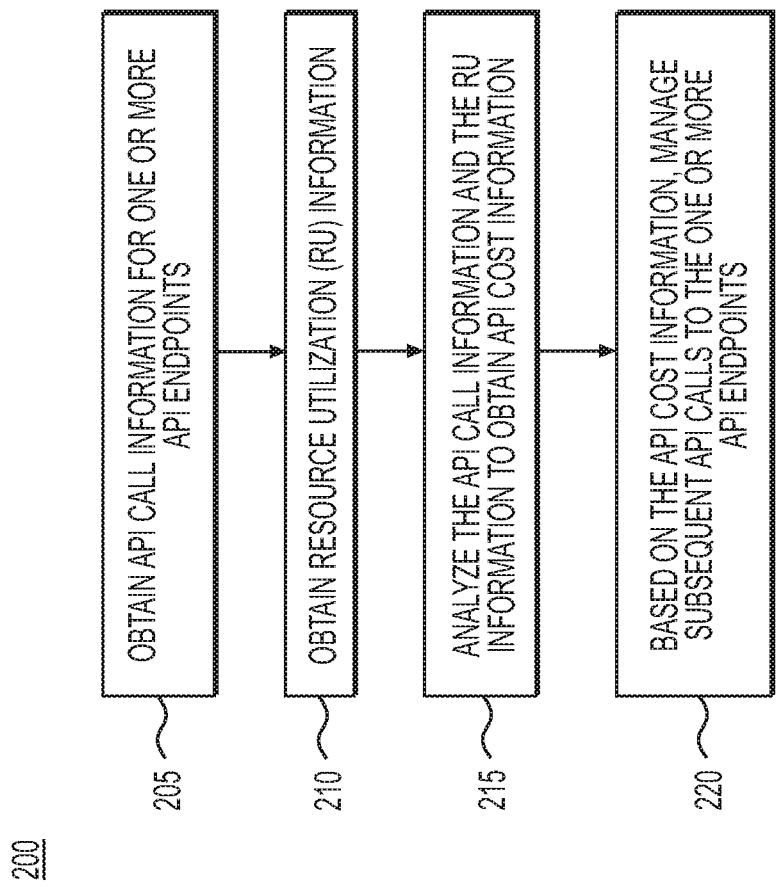
FIG. 2 depicts a flowchart of an exemplary method of API call management, according to one or more embodiments.

FIG. 2 depicts a flowchart of an exemplary process 200 for API call management according to one or more embodiments, and may be performed in the exemplary environment of FIG. 1. Process 200 may be performed by gateway 120 as described above with reference to FIG. 1. It is understood, however, that process 200 may be performed by any combination of the components depicted in and described with reference to FIG. 1 (e.g., user device 105, internal server 115, and/or external server 130) in other embodiments.

Process 200 may, in some embodiments, begin with step 205, in which API call information for one or more API endpoints may be obtained by gateway 120. In some embodiments, obtaining the API call information for the one or more API endpoints may include analyzing API call requests to determine requesting projects and API endpoints for the API call requests and updating a data structure to include the requesting projects in association with the API endpoints. In some embodiments, API calls may each have one or more associated tags (also referred to as labels). In such embodiments, the API call information may be obtained based on such tags. In some embodiments, API call information may be obtained based on proxy logs. In some embodiments, API calls may pass through a dedicated API layer (e.g., a dedicated API interface for all API calls). In such embodiments, the API call information may be obtained based on API calls passing though the dedicated API layer.

In step 210, resource utilization (RU) information may be obtained by gateway 120. In some embodiments, obtaining the RU information may include: automatically transmitting a request to a cloud service (e.g., external server 130) for budget, cost, computes, and/or storage for projects of the one or more projects; receiving a response from the cloud service (e.g., external server 130), the response including the budget, cost, computes, and/or storage for the projects of the one or more projects; and processing the budget, cost, computes, and/or storage for the projects of the one or more projects into an amount of resource units. In some embodiments, obtaining the RU information may further include: obtaining (e.g., from internal server 115) physical cost information for a physical infrastructure associated with the projects of the one or more projects; obtaining (e.g., from internal server 115) human resource cost information for human resources associated with the projects of the one or more projects; processing the physical cost information and the human resource cost information for the projects of the one or more projects into a second amount of resource units; and combining the amount of resource units and the second amount of resource units for the projects of the one or more projects to obtain a cost for each of the projects of the one or more projects. In some embodiments, RU information may be obtained based on tags (also referred to as labels) for resources associated with the one or more projects. For example, RU information may be determined by retrieving RU information based on such tags for the one or more projects.

In step 215, the API call information and the RU information may be analyzed by gateway 120 to obtain API cost information. In some embodiments, the API cost information may include cost per API call for the one or more API endpoints. In some embodiments, analyzing the API call requests may be performed by a function executing on gateway 120 and/or analyzing router logs of the gateway. The function tracking incoming API call requests as the incoming API call requests may be processed by gateway 120.

In some embodiments, analyzing the API call information and the RU information to obtain the API cost information may include: retrieving data from the data structure; processing the data to determine a number of API calls to each of the one or more API endpoints; and determining the cost per API call for the one or more API endpoints by: dividing the cost for each of the one or more projects by the number of API calls to each of the API endpoints corresponding to the one or more projects for API endpoints corresponding to the one or more projects, and obtaining pricing rules from service(s) associated with the API endpoints not corresponding to the one or more projects for API endpoints not corresponding to the one or more projects.

In step 220, subsequent API calls to the one or more API endpoints may be managed by gateway 120 based on the cost per API call. In some embodiments, managing the subsequent API calls to the one or more API endpoints may include: receiving an API call request from a project, the API call request indicating an API call to an API endpoint; retrieving a cost per API call for the API endpoint; determining whether a budget of the project is sufficient for the cost per API call; and declining the API call request when the determining determines the budget of the project is not sufficient for the cost per API call. In some embodiments, determining whether the budget of the project is sufficient for the cost per API call may include determining whether a profit per API call exceeds a cost per API call. In the context of the current disclosure, a profit per API call may be referred to as value added per API call. In the context of the current disclosure, a cost per API call may be referred to as resource utilization (RU) per API call. Accordingly, it may be desirable to lower the RU per API call in some instances.

In some embodiments, managing the subsequent API calls to the one or more API endpoints may further include: determining whether the API call request includes a priority request when the determining determines the budget of the project is sufficient for the cost per API call; and performing a priority process when the determining determines the API call request includes the priority request. In some embodiments, the priority process may include parsing the API call request to extract a bid; obtaining other bids for other API call requests; comparing the bid and the other bids to sort the bid and other bids in an ordered list; and permitting the API calls associated with the API call request and other API call requests in order of the ordered list.

In some embodiments, managing the subsequent API calls to the one or more API endpoints may further include: determining whether the API call request includes a conditional request when the determining determines the API call request does not include the priority request; and holding the API call request until a condition of the conditional request is met when the determining determines the API call request includes the conditional request.

Figure 3:
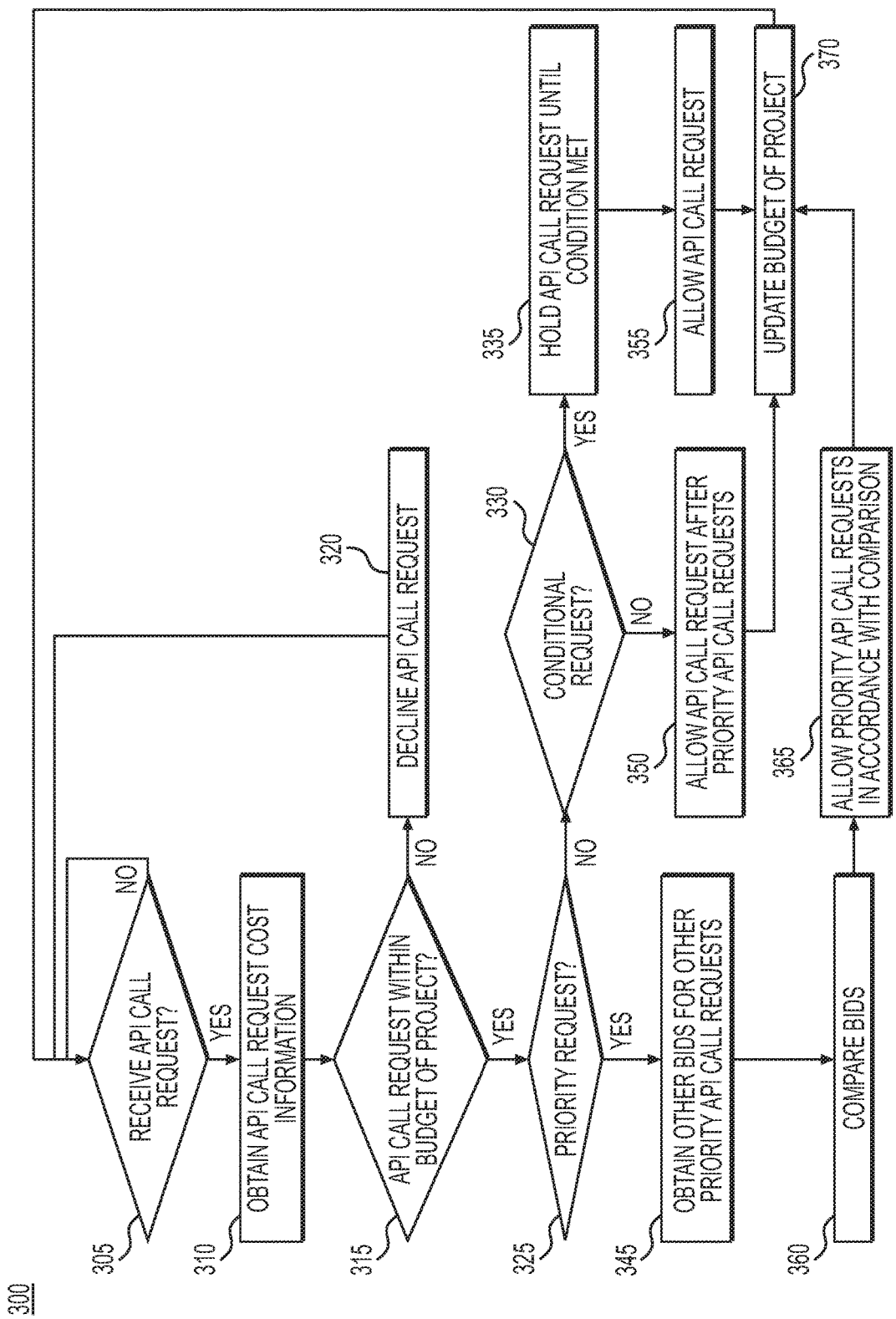
FIG. 3 depicts a flowchart of an exemplary method of API call management, according to one or more embodiments.

FIG. 3 depicts a flowchart of an exemplary process 300 of API call management according to one or more embodiments, and may be performed in the exemplary environment of FIG. 1. Process 300 may be performed by gateway 120 as described above with reference to FIG. 1. It is understood, however, that process 300 may be performed by any combination of the components depicted in and described with reference to FIG. 1 (e.g., user device 105, internal server 115, and/or external server 130) in other embodiments.

Process 300 may, in some embodiments, begin with step 305, in which gateway 120 may determine whether an API call request has been received. In the context of the current disclosure, an API call request may include one or more API calls to an API endpoint. For example, an API call request may be to open a word processor document. In such instances, the API call request may include an API call to access a word processor and a subsequent API call to open the word processor document using the word processor. Hereafter, while the API call request may include one or more API calls, this description will refer to the one or more API calls included in the API call request as the API call included in the API call request. Based on a determination that an API call request has not been received, the process may return to step 305 in which gateway 120 may wait for an API call request. Based on a determination that an API call request has been received, the process 300 moves on to step 310. In step 310, cost information associated with the API call request may be obtained by gateway 120. In some embodiments, obtaining the cost information associated with the API call may include obtaining (e.g., from internal server 115) physical cost information for a physical infrastructure associated with the project to which the API call request is directed to and/or obtaining human resource cost information for human resources associated with the project. In step 315, gateway 120 may determine whether the obtained cost associated with the API call request falls within a predetermined budget for the project. If the obtained cost associated with the API call request does not fall within the predetermined budget for the project (step 315: No), the process 300 moves to step 320 at which the API call request is declined by gateway 120. Following declining the API call request, the process may return to step 305 in which gateway 120 may wait for an API request. If the obtained cost associated with the API call request does fall within the predetermined budget for the project (step 315: Yes), the process 300 may advance to step 325 in which gateway 120 may determine whether the API call request is a priority request. In some embodiments, a priority request may refer to an API call request associated with a project that has relatively higher priority compared to other projects. For example, a project may be designated as a priority project during planning and execution phases of the project. In such instances, any API call requests associated with the priority project may be determined to be a priority request and take precedence over API call requests associated with projects that have not been designated as priority projects. In some embodiments, the API call request may include information indicating whether or not the API call request is a priority request.

If the API call request is a priority request, the process 300 moves on to step 345 in which other bids for other priority API call requests are obtained by gateway 120. In the context of the current disclosure, bids may comprise resource utilization associated with each of the API call requests. In some embodiments, gateway 120 may parse each received priority API call request to obtain each associated bid. For example, gateway 120 may identify and extract information included in each received priority API call request that indicates the associated bid. Accordingly, gateway 120 may determine the bid for each priority API call request based on the parsed (e.g., identified and extracted) information. In step 360, the bids for each of the priority API call requests are compared by gateway 120. In some embodiments, comparing the bids may include comparing the resource utilization associated with each of the priority API call requests. For example, a priority API call request may include an API call to a cloud computing platform with an unlimited access subscription where another priority API call request may include an API call to a cloud computing platform with a cost per access subscription. In such instances, the priority API call request associated with the unlimited access subscription may have the higher resource utilization (also referred to as having the higher bid). In step 365, the priority API call requests may be permitted by gateway 120 in accordance to the comparison performed in step 360. For example, the priority API call request associated with the unlimited access subscription (with reference to the example above) may be permitted prior to the priority API call request associated with the cost per access subscription. In some embodiments, the process 300 may further include a step in which the priority API call requests are ranked by gateway 120 in the order of associated costs, e.g., resource utilization. In such embodiments, the API call requests may be permitted in the ranked order in step 365. In step 370, the budget of the project associated with each of the priority API call requests may be updated by gateway 120 based on the resources utilized by each respective API call.

Referring back to step 325, it may be determined by gateway 120 that the API call request is not a priority request (step 325: No). In such instances, process 300 may proceed to step 330, in which it is determined whether the API call request is a conditional request. That is, it is determined whether the API call request includes a condition that must be met in order for the API call request to be permitted. For example, the API call request may include an API call to a cloud computing platform with a cost per access subscription. In such instances, a condition included in the API call request may be to hold the API call until the cost for access to the cloud computing platform falls below a certain amount. In some embodiments, the API call request may include information indicating such conditions. In step 335, the API call request may be held by gateway 120 until the condition is met. For example, the API call request may be held until the cost for access to the cloud computing platform falls below a certain amount. In some embodiments, gateway 120 may request and receive information from external server 130 regarding the cost to access the cloud computing platform. In such embodiments, gateway 120 may determine that the condition has been met based on information received from external server 130. Once the condition is met, the API call request may be permitted in step 355. In step 370, the budget of the project associated with the API call request may be updated by gateway 120 based on the resources utilized by the API call.

Referring back to step 330, it may be determined that the API call request is not a conditional request (step 330: No). The process 300 may then proceed to step 350, in which the API call request may be permitted after other priority API call requests are permitted. In step 370, the budget of the project associated with each of the priority API call requests and the API call request may be updated based on the resources utilized by each respective API call.

In some embodiments, one or more graphs and/or charts may be generated based on processing of the API call requests as disclosed herein. For example, the one or more graphs and/or charts may depict resource utilization of various API call requests for one or more projects as described above with reference to FIGS. 1, 2, and 3. The one or more graphs and/or charts may displayed to a user via one or more of the displays/UIs 105A, 115A, 120A, 130A described above with reference to FIG. 1.

Figure 4:
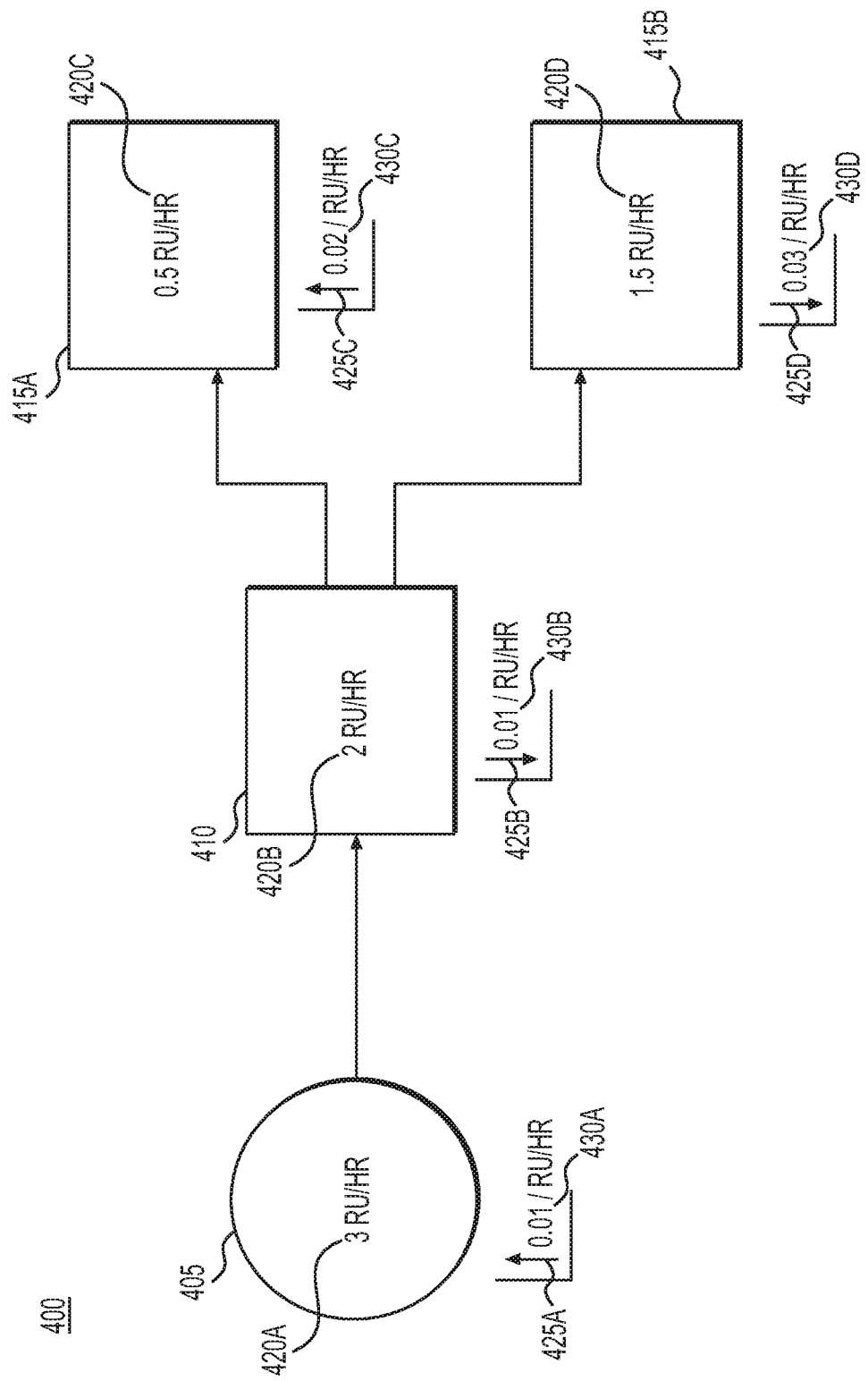
FIG. 4 depicts an exemplary display indicating resource utilization for an endpoint for a project, according to one or more embodiments.

FIG. 4 depicts a display 400 indicating resource utilization for an endpoint 405 for a project, according to one or more embodiments. In some embodiments, the endpoint 405 may be the point of interaction with one or more customers for a project associated with the endpoint 405. In such embodiments, each time a customer interacts with the endpoint 405, the project may be gaining resources as opposed to consuming existing resources, for example, allocated budget for the project. Accordingly, the display 400 may include an element indicating the endpoint 405 and text 420A indicating that the project is gaining 3 resource utilization (RU) units per hour. In some embodiments, the display 400 may further include an element indicating the progression of the RU per hour at the endpoint 405. For example, the display 400 may include an upward arrow 425A indicating that the RU per hour is increasing and text 430A indicating that the RU per hour is increasing by 1 percent.

The endpoint 405 may generate one or more API call requests in accordance to customer interactions. For example, the endpoint 405 may generate API call requests 410, and the API call requests 410 may consume existing resources to accommodate customer interactions. The display 400 may include an element indicating the API call requests 410 and text 420B indicating that the project is consuming 2 RU per hour due to the API call request 410. In some embodiments, the display 400 may further include an element indicating the progression of the RU per hour for the API call requests 410. For example, the display 400 may include a downward arrow 425B indicating that the RU per hour is decreasing, thereby gradually consuming less RU, and text 430B indicating that the RU per hour is decreasing by 1 percent.

The API call requests 410 may include one or more API calls directed to a first resource 415A and one or more API calls directed to a second resource 415B. Each resource may consume existing resources and the display 400 may include an element indicating the first resource 415A and text 420C indicating that the project is consuming 0.5 RU per hour due to API calls directed to the first resource 415A, and an element indicating the second resource 415B and text 420D indicating that the project is consuming 1.5 RU per hour due to API calls directed to the second resource 415B. In some embodiments, the display 400 may further include an element indicating the progression of the RU per hour for the first and second resources 415A-415B. For example, the display 400 may include an upward arrow 425C indicating that the RU per hour is increasing for the first resource 415A, thereby gradually consuming more RU, and text 430C indicating that the RU per hour is increasing by 2 percent. The display 400 may include downward arrow 425D indicating that the RU per hour is decreasing for the second resource 415B, thereby gradually consuming less RU, and text 430D indicating that the RU per hour is decreasing by 3 percent.

In some embodiments, API calls for a project may be reconfigured to optimize resource utilization for the project. For example, API calls directed to the first resource 415A may be redirected to the second resource 415B based on the gradual decrease of RU per hour for the second resource 415B, as shown in and described with reference to FIG. 4.

Figure 5:
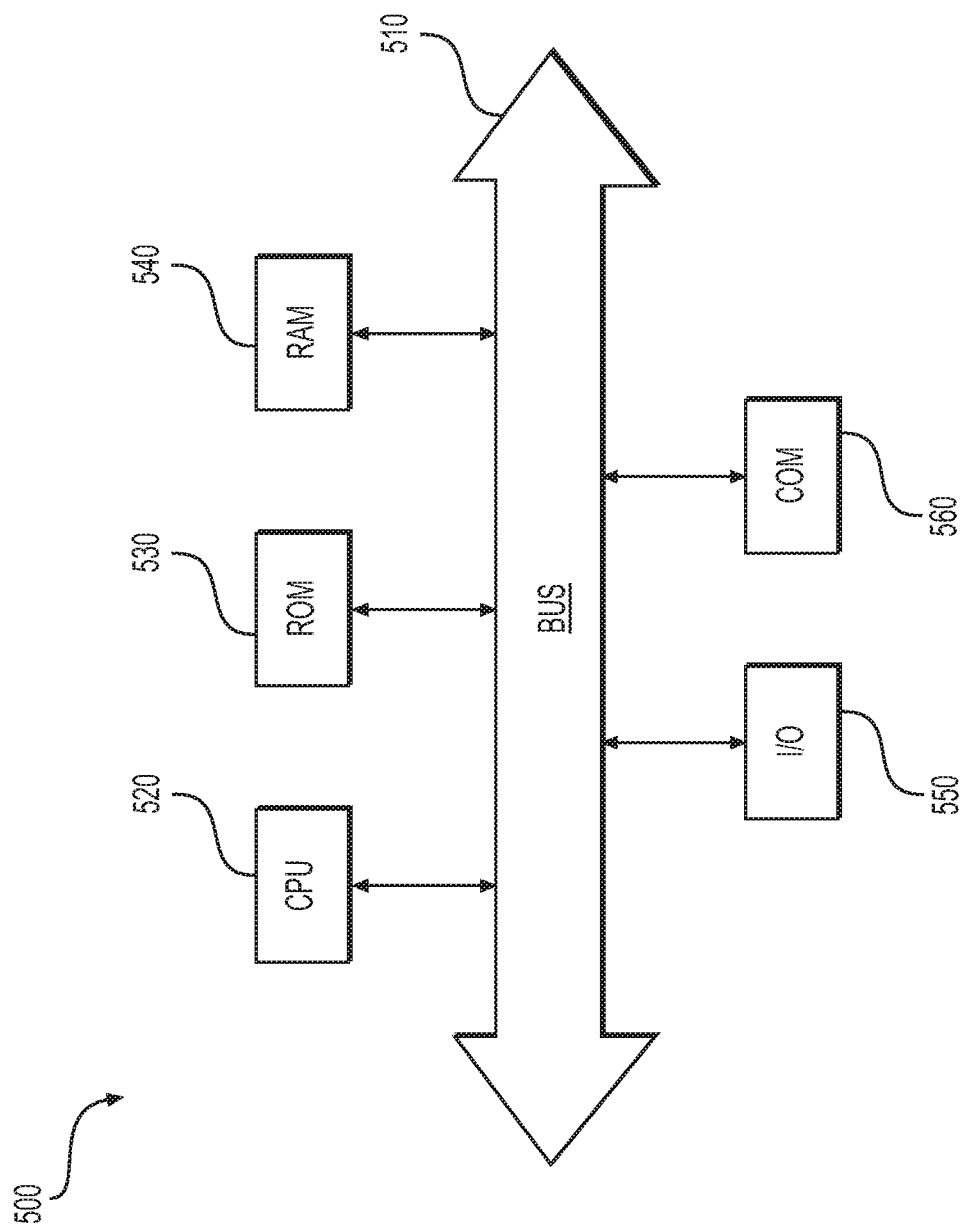
FIG. 5 depicts an exemplary computer device or system, in which embodiments of the present disclosure, or portions thereof, may be implemented.

As shown in FIG. 5, a device 500 used for performing the various embodiments of the present disclosure (e.g., user device 105, internal server 115, gateway 120, external server 130, and/or any other computer system or user terminal for performing the various embodiments of the present disclosure) may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 may be connected to a data communication infrastructure 510, for example, a bus, message queue, network, or multi-core message-passing scheme.

A device 500 (e.g., user device 105, internal server 115, gateway 120, external server 130, and/or any other computer system or user terminal for performing the various embodiments of the present disclosure) may also include a main memory 540, for example, random access memory (RAM), and may also include a secondary memory 530. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

A device 500 may also include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order (e.g., steps may be added, removed, or repeated), or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A method for application program interface (API) call management, comprising:
    obtaining API call information for one or more API endpoints, the API call information including a number of API calls to the one or more API endpoints;
    obtaining resource utilization (RU) information, the RU information comprising project RU information for one or more projects wherein the project RU information includes one or more of data storage usage information, network data usage information, or cost information;
    analyzing the API call information and the RU information to obtain API cost information, the API cost information including cost per API call for the one or more API endpoints, wherein the analyzing the API call information and the RU information to obtain the API cost information includes:
        determining a number of API calls to each of the one or more API endpoints; and
        determining the cost per API call for the one or more API endpoints by:
            for API endpoints corresponding to the one or more projects, dividing a cost for each of the one or more projects by the number of API calls to each of the API endpoints corresponding to the one or more projects, and for API endpoints not corresponding to the one or more projects, obtaining pricing rules from service(s) associated with the API endpoints not corresponding to the one or more projects; and based on the cost per API call, managing subsequent API calls to the one or more API endpoints by performing an API call request management process, the API call request management process including:

receiving an API call request from a project, the API call request indicating an API call to an API endpoint;

retrieving a cost per API call for the API endpoint;

determining whether a budget of the project is sufficient for the cost per API call;

when the determining determines the budget of the project is not sufficient for the cost per API call, declining the API call request; and when the determining determines the budget of the project is sufficient for the cost per API call, permitting the API call of the API call request.

2. The method of claim 1, wherein the obtaining the API call information for the one or more API endpoints includes:

analyzing API call requests to determine requesting projects and API endpoints for the API call requests; and updating a data structure to include the requesting projects in association with the API endpoints.

3. The method of claim 2, wherein the analyzing the API call requests is performed by:

a function executing on a gateway, the function tracking incoming API call requests as the incoming API call requests are processed by the gateway; or analyzing router logs of the gateway.

4. The method of claim 2, wherein the obtaining the RU information includes:

automatically transmitting a request to a cloud service for budget, cost, computes, and/or storage for projects of the one or more projects;

receiving a response from the cloud service, the response including the budget, cost, computes, and/or storage for the projects of the one or more projects; and processing the budget, cost, computes, and/or storage for the projects of the one or more projects into an amount of resource units.

5. The method of claim 4, wherein the obtaining the RU information further includes:

obtaining physical cost information for a physical infrastructure associated with the projects of the one or more projects;

obtaining human resource cost information for human resources associated with the projects of the one or more projects;

processing the physical cost information and the human resource cost information for the projects of the one or more projects into a second amount of resource units; and combining the amount of resource units and the second amount of resource units for the projects of the one or more projects to obtain a cost for each of the projects of the one or more projects.

6. The method of claim 5, wherein determining a number of API calls to each of the one or more API endpoints includes:

retrieving data from the data structure; and processing the data to determine the number of API calls to each of the one or more API endpoints.

7. The method of claim 1, wherein the managing the subsequent API calls to the one or more API endpoints further includes:

when the determining determines the budget of the project is sufficient for the cost per API call, determining whether the API call request includes a priority request; and when the determining determines the API call request includes the priority request, performing a priority process.

8. The method of claim 7, wherein the priority process includes:

parsing the API call request to extract a bid;

obtaining other bids for other API call requests;

comparing the bid and the other bids to sort the bid and other bids in an ordered list; and permitting the API calls associated with the API call request and other API call requests in order of the ordered list.

9. The method of claim 7, wherein the managing the subsequent API calls to the one or more API endpoints further includes:

when the determining determines the API call request does not include the priority request, determining whether the API call request includes a conditional request; and when the determining determines the API call request includes the conditional request, holding the API call request until a condition of the conditional request is met.

10. A system for application program interface (API) call management, the system comprising:

a memory storing instructions; and a processor executing the instructions to perform a process including:

obtaining API call information for one or more API endpoints, the API call information including a number of API calls to the one or more API endpoints;

obtaining resource utilization (RU) information, the RU information comprising project RU information for one or more projects wherein the project RU information includes one or more of data storage usage information, network data usage information, or cost information;

analyzing the API call information and the RU information to obtain API cost information, the API cost information including cost per API call for the one or more API endpoints, wherein the analyzing the API call information and the RU information to obtain the API cost information includes:

determining a number of API calls to each of the one or more API endpoints; and determining the cost per API call for the one or more API endpoints by:

for API endpoints corresponding to the one or more projects, dividing a cost for each of the one or more projects by the number of API calls to each of the API endpoints corresponding to the one or more projects, and for API endpoints not corresponding to the one or more projects, obtaining pricing rules from service(s) associated with the API endpoints not corresponding to the one or more projects; and based on the cost per API call, managing subsequent API calls to the one or more API endpoints by performing an API call request management process, the API call request management process including:

receiving an API call request from a project, the API call request indicating an API call to an API endpoint;
retrieving a cost per API call for the API endpoint;
determining whether a budget of the project is sufficient for the cost per API call;
when the determining determines the budget of the project is not sufficient for the cost per API call, declining the API call request; and
when the determining determines the budget of the project is sufficient for the cost per API call, permitting the API call of the API call request.

11. The system of claim 10, wherein the process further includes, to obtain the API call information for the one or more API endpoints:
analyzing API call requests to determine requesting projects and API endpoints for the API call requests; and
updating a data structure to include the requesting projects in association with the API endpoints.

12. The system of claim 11, wherein the process further includes, to analyze the API call requests:
executing a function on a gateway, the function tracking incoming API call requests as the incoming API call requests are processed by the gateway; or
analyzing router logs of the gateway.

13. The system of claim 11, wherein the process further includes, to obtain the RU information:
automatically transmitting a request to a cloud service for budget, cost, computes, and/or storage for projects of the one or more projects;
receiving a response from the cloud service, the response including the budget, cost, computes, and/or storage for the projects of the one or more projects; and
processing the budget, cost, computes, and/or storage for the projects of the one or more projects into an amount of resource units.

14. The system of claim 13, wherein the process further includes, to obtain the RU information:
obtaining physical cost information for a physical infrastructure associated with the projects of the one or more projects;
obtaining human resource cost information for human resources associated with the projects of the one or more projects;
processing the physical cost information and the human resource cost information for the projects of the one or more projects into a second amount of resource units; and
combining the amount of resource units and the second amount of resource units for the projects of the one or more projects to obtain a cost for each of the projects of the one or more projects.

15. The system of claim 14, wherein determining a number of API calls to each of the one or more API endpoints includes:
retrieving data from the data structure; and
processing the data to determine the number of API calls to each of the one or more API endpoints.

16. The system of claim 10, wherein the API call request management process further includes, before the permitting the API call of the API call request:
determining whether the API call request includes a priority request; and
when the determining determines the API call request includes the priority request, performing a priority process.

17. The system of claim 16, wherein the priority process includes:
parsing the API call request to extract a bid;
obtaining other bids for other API call requests;
comparing the bid and the other bids to sort the bid and other bids in an ordered list; and
permitting the API calls associated with the API call request and other API call requests in order of the ordered list.

18. The system of claim 16, wherein the API call request management process further includes:
when the determining determines the API call request does not include the priority request, determining whether the API call request includes a conditional request; and
when the determining determines the API call request includes the conditional request, holding the API call request until a condition of the conditional request is met.

19. A method for application program interface (API) call management, the method comprising:
obtaining API call information for one or more API endpoints by analyzing API call requests to determine requesting projects and API endpoints for the API call requests and updating a data structure to include the requesting projects in association with the API endpoint, the API call information including a number of API calls to the one or more API endpoints;
obtaining resource utilization (RU) information, the RU information comprising project RU information for one or more projects wherein the project RU information includes one or more of data storage usage information, network data usage information, or cost information;
analyzing the API call information and the RU information to obtain API cost information, the API cost information including cost per API call for the one or more API endpoints, wherein the analyzing the API call information and the RU information to obtain the API cost information includes:
determining a number of API calls to each of the one or more API endpoints; and
determining the cost per API call for the one or more API endpoints by:
for API endpoints corresponding to the one or more projects, dividing a cost for each of the one or more projects by the number of API calls to each of the API endpoints corresponding to the one or more projects, and
for API endpoints not corresponding to the one or more projects, obtaining pricing rules from service(s) associated with the API endpoints not corresponding to the one or more projects; and
based on the cost per API call, managing subsequent API calls to the one or more API endpoints by performing an API call request management process, the API call request management process including:
receiving an API call request from a project, the API call request indicating an API call to an API endpoint;
retrieving a cost per API call for the API endpoint;
determining whether a budget of the project is sufficient for the cost per API call;
when the determining determines the budget of the project is not sufficient for the cost per API call, declining the API call request;
when the determining determines the budget of the project is sufficient for the cost per API call, permitting the API call of the API call request and determining whether the API call request includes a priority request; and when the determining determines the API call request includes the priority request, performing a priority process.

* * * * *